(12) United States Patent
Rowland

(10) Patent No.: US 6,386,807 B1
(45) Date of Patent: May 14, 2002

(54) STACKABLE TRAILERS

(76) Inventor: Leroy J. Rowland, P.O. Box 340, Folly Beach, SC (US) 29439

( * ) Notice: Subject to any disclaimer, the term of this patent is extended or adjusted under 35 U.S.C. 154(b) by 0 days.

(21) Appl. No.: 09/530,530
(22) PCT Filed: Nov. 3, 1998
(86) PCT No.: PCT/US98/23372
§ 371 Date: May 2, 2000
§ 102(e) Date: May 2, 2000
(87) PCT Pub. No.: WO99/22958
PCT Pub. Date: May 14, 1999

Related U.S. Application Data

(63) Continuation of application No. 08/962,575, filed on Nov. 3, 1997, now Pat. No. 5,934,695.

(51) Int. Cl.⁷ .................................................. B60P 3/06
(52) U.S. Cl. ...................... 410/57; 280/33.998; 280/789
(58) Field of Search ........................ 280/33.991, 33.998, 280/789; 410/30, 56, 57, 65, 66; 296/181, 182

(56) References Cited

U.S. PATENT DOCUMENTS

| 1,538,297 A | 5/1925 | Mitchell |
| 3,580,627 A | 5/1971 | Underwood |
| 3,611,949 A | 10/1971 | Peisner |
| 3,841,509 A | 10/1974 | Chisum |
| 4,066,289 A | 1/1978 | Gargour |
| 4,611,962 A | 9/1986 | Braly et al. |
| 4,952,118 A | 8/1990 | MacMillian |
| 4,986,705 A | 1/1991 | Durkin |
| 5,873,593 A | 2/1999 | Gesuale |

Primary Examiner—Kevin Hurley
(74) Attorney, Agent, or Firm—Dority & Manning, P.A.

(57) ABSTRACT

A method and apparatus for stacking two or more trailers (10) that are used for transporting containers. Each of the trailers (10) has recesses (48, 50) positioned directly over the rear wheels for receiving the rear wheels (34) of a trailer (10) stacked thereon. Smaller recesses (60) are provided adjacent a front end of the trailer for receiving a wheel (46) carried on the lower end of a landing gear (42) of the trailer (10) stacked thereon. The trailer can be stacked upon one another for storage.

6 Claims, 5 Drawing Sheets

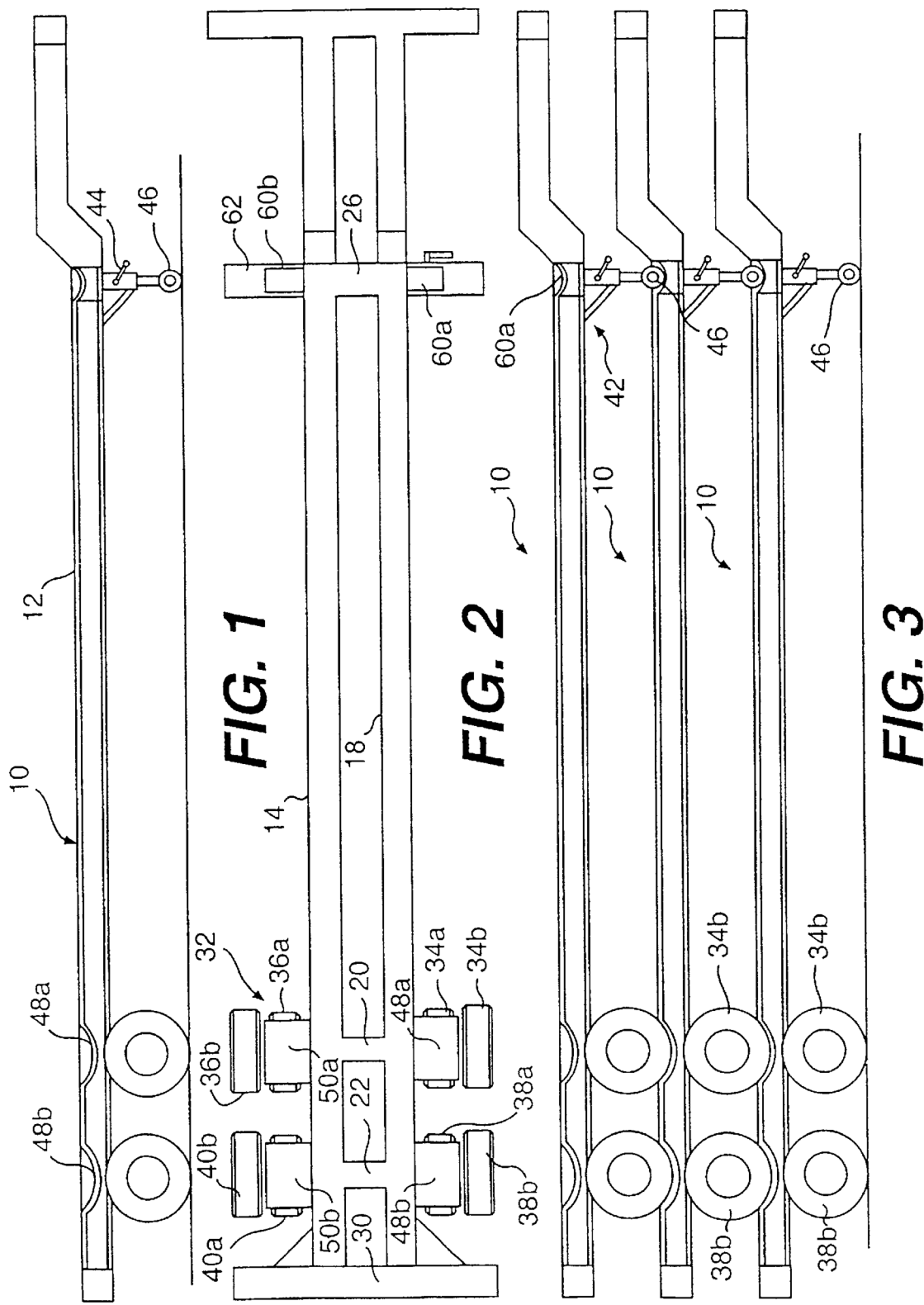

STACKABLE TRAILERS

This application is a continuation of U.S. application Ser. No. 08/962,575 filed Nov. 3, 1997, now U.S. Pat. No. 5,934,695.

BACKGROUND OF THE INVENTION

In recent years, it has become common practice to ship goods in metal containers that are adapted to be transported by ship and tractor trailers. As a result of the ships carrying a substantial number of the containers, it is necessary to maintain an inventory of trailers at the unloading and loading sites. Such takes up a substantial amount of space. Normally, the ports where the containers are shipped are limited in size presenting a problem for storing large numbers of trailers waiting to be used. It has been common practice in the past to stack one trailer upon another. However, when they are placed one on top of the other, they are normally inverted requiring each trailer as they are being unstacked to be turned over so as to properly position the wheels on the ground for use. This oftentimes causes damage to the hydraulic equipment associated with the trailers.

In U.S. Pat. No. 4,611,962 there is disclosed a container chassis bundling system wherein trailers are stacked upon each other. Each of these trailers require substantial modifications so that the trailers can be securely stacked one upon the other.

SUMMARY OF THE INVENTION

A method and apparatus for stacking two or more trailers used for transporting containers upon each other. Each of the trailers includes an elongated body portion, a set of rear wheels and a retractable landing gear. Recesses are provided on the elongated body portion adjacent a rear end of the elongated body directly above the rear wheels of the trailer. A second pair of recesses are provided in the elongated body portion of the trailer for receiving a landing gear of a trailer stacked thereon. As a result of the recesses provided in the elongated body portion of the trailer, the trailers can be stacked one upon the other with the recesses adjacent the rear of the trailer and adjacent the front of the trailer receiving the tires and landing gear of the trailer stacked thereon respectively. Accordingly, it is an important object of the present invention to provide trailers capable of transporting containers with recesses so as to enable trailers to be stacked one upon the other.

Another important object of the present invention is to provide trailers with stacking recesses which securely position a trailer stacked thereon in position.

Still another important object of the present invention is to provide a method of conserving space in shipping yards by designing trailers that are used for shipping containers so that they can be stacked one upon the other.

Another important object is to provide a removable support for a trailer for permitting stacking of similar trailers upon each other.

BRIEF DESCRIPTION OF THE DRAWINGS

Many additional objects and advantages of the present invention will be evident to those skilled in the art from the following description and drawings, wherein:

FIG. 1 is a side elevational view illustrating a trailer constructed in accordance with the present invention.

FIG. 2 is a planned view of a trailer constructed in accordance with the present invention.

FIG. 3 is a side elevational view showing three trailers stacked one upon the other.

DESCRIPTION OF THE PREFERRED EMBODIMENTS

Figure 4:
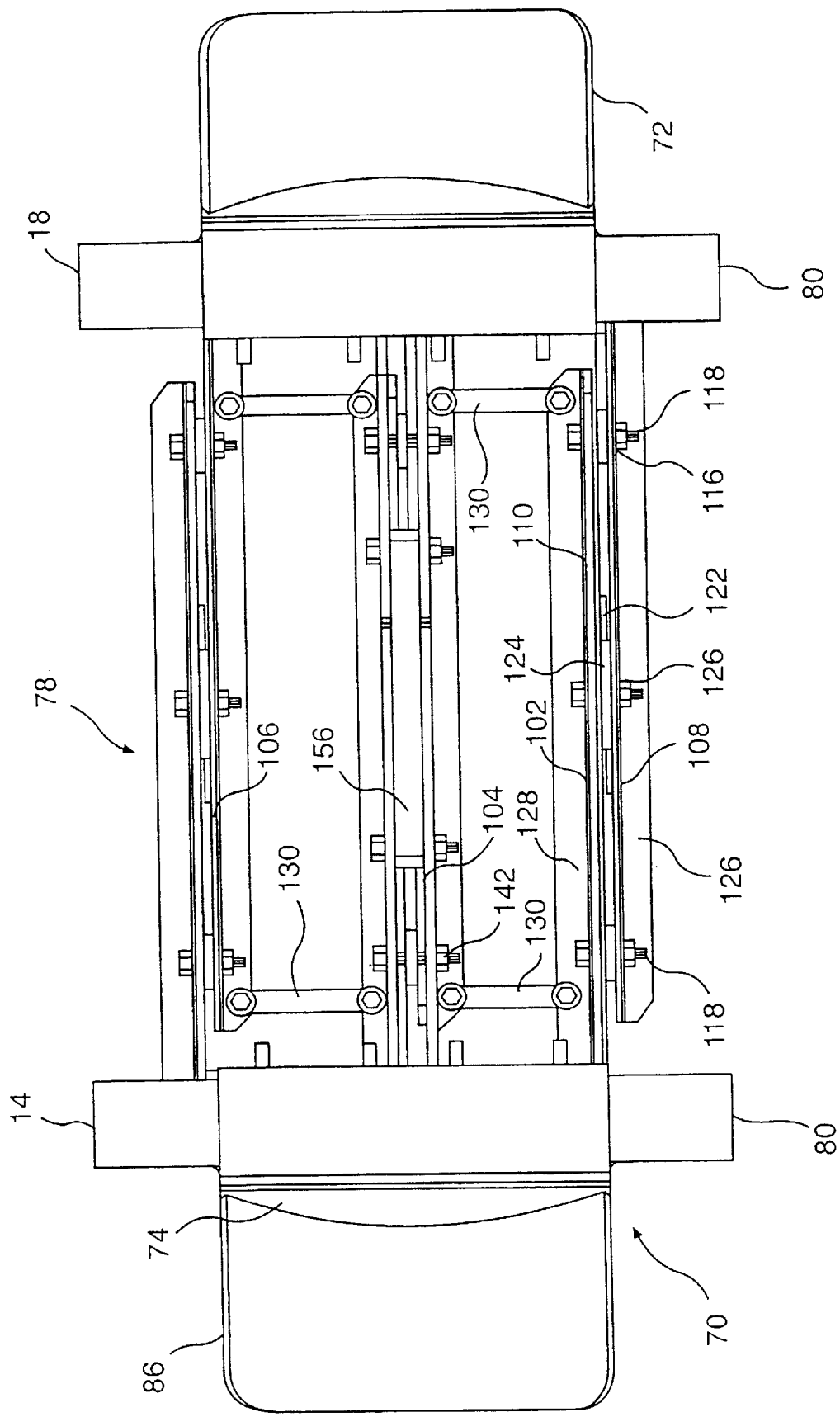
FIG. 4 is a plan view illustrating a removable and support for trailers.

Referring to FIG. 1 of the drawing, there is illustrated a conventional trailer generally designated by the reference character 10 that is normally used for transporting containers and the like. The containers not shown are normally rectangular in shape and are generally shipped by rail or by ships. The containers, when being transported by ship, are generally stacked one on top of another so that a ship can carry a very large number of containers. When these containers arrive at port, it is necessary to transfer them from the ship to the flatbed trailers 10 that are connected to tractors for transporting the containers to their desired destination. The trailers include an elongated body 12 that generally consists of two parallel eye beams 14 and 18. The eye beams are connected together by any suitable bracing such as the cross-braces 20, 22 and 26. Laterally extending beams 28 and 30 are connected to the opposed ends of the beams 14 and 18.

The rear end of the trailers 10 are supported by a pair of tandem wheels generally designated by the reference character 32. Each pair of tandem wheels include four wheels 34a, 34b, 36a, 36b, and 38a, 38b, 40a and 40b, respectively. The wheels 34a, 34b, 36a and 36b are supported on one axle. The wheels 38a, 38b, 40a and 40b are supported on another axle. The axles are in turn supported by the rear end of the elongated body of the trailer in a conventional manner and as a result, the details of such are not illustrated. When the trailer 10 is parked, the front of the trailer is supported on a landing gear generally designated by the reference character 42 that is carried adjacent the front end of the trailer. The landing gear 42 can be raised and lowered in any suitable manner such as by a crank 44. The landing gear 42 is shown in its lowered position. Positioned adjacent the lower end of the landing gears 42 are a pair of small wheels 46.

A pair of arcuate recesses 48a and 48b are carried adjacent the rear end of the elongated body portion of the trailer. Another pair of arcuate recesses 50a and 50b are carried on the other side of the I-beams 18 and 14. The location of the recesses 48a, 48b, 50a and 50b is such that they are positioned directly above the innermost tires of the tandem wheels, that is the tires 34a, 36a, 38a and 40a. Such is to enable a trailer to be stacked on top of another trailer so that the innermost tires 34a, 36a, 38a and 40a can rest within the respective recesses 48a, 48b, 50a and 50b. The recesses can be suitably braced for carrying substantial loads and are normally constructed of metal. The bracing for the recesses is not disclosed since such can be accomplished in any suitable manner that would be known to one skilled in the art.

Positioned adjacent the other end of the trailer is another pair of smaller recesses 60a and 60b. These recesses 60a and 60b are provided in a cross support member 62 that is secured to the elongated eye beams 14 and 18. The recesses 60a and 60b are arcuate in shape for receiving the wheels 46 carried on the lower end of the landing gear.

When the trailers are stacked as shown in FIG. 3, the innermost wheels of each pair of tandem wheels are positioned within the arcuate members 48a, 48b, 50a and 50b and the two wheels 46 carried on the lower end of the landing gear nest within the arcuate members 60a and 60b. As a result, the trailers are securely stacked one upon the other. While in the preferred embodiment recesses are used for receiving the wheels of trailers when stacking, it is to be understood that other types of wheel receivers could be used as long as the wheel receivers prevent the stacked trailer from moving on the trailer therebelow.

On some trailer, there is a flat plate on the bottom of the landing gear. When stacking these trailers is not necessary to use an arcuate receiver 60a such as shown in the drawing and in some instances it is not necessary to use a receiver. In a modified form of the invention a rectangular receiver formed by rods or flat plates can be welded together and fixed to the trailer bed. They correspond to the shape of the flat plate carried on the bottom of the landing gear. The flat plate carried on the bottom of the landing gear would, when stacking trailers, be positioned in a recess defined by the welded rods or plates to positively position the stacked trailer on the trailer supporting it. In other words, the recess formed by the welded rods would be used instead of the arcuate receiver 60a.

Referring to FIGS. 4 through 7, there is illustrated a portable and removable support for a trailer for permitting stacking of similar trailers upon each other. The support includes a pair of cradle assemblies 70 and 72 that are attached by a bracket 76 to a respective I-beam 14 and 18. Bracing, generally designated by the reference character 78, is carried between the I-beams 14 and 18 for securing the entire cradle assembly to the I-beams and for locking the cradle assemblies 70 and 72 through the bracket 76 to the I-beams.

The I-beams 14 and 18 each include an upper horizontal surface 80 and a lower horizontally extending surface 82 which are joined by a vertically extending plate 84. The cradle assembly 70 includes an arcuately shaped concave plate 86 that has a curvature corresponding to the curvature of the tire of the trailer that is to be stacked thereon. The curved plate 86 is supported on three braces 88 that have a downwardly extending leg portions 90 that rests on an upper surface of the lower horizontal-flange 82 of the I-beam. Additional bracing 92 in the form of semicircular plates 92 are welded to a lower side of the braces 88 for adding additional strength thereto.

Figure 5:
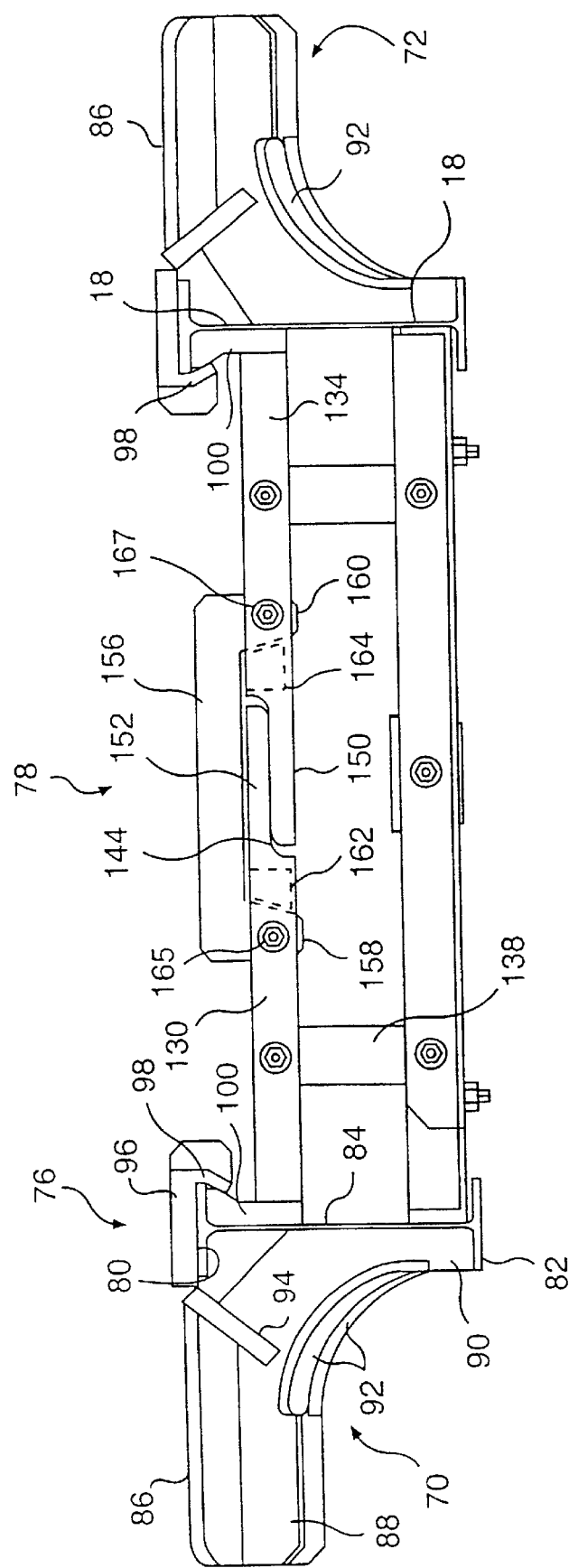
FIG. 5 is an end view illustrating the bracing and cradles of the removable support.

The bracket 76 includes a downwardly sloped surface 94 that extends into slots provided in the braces 88. The upper edge of the sloped surface 94 is welded to a horizontally extending plate 96 that extends over the upper surface of the I-beam. The horizontally extending surface 96 terminates in a downwardly extending flange 98 which is bent back toward the vertical flange 84 of the I-beam as best shown in FIG. 5. The curved plate 86 is welded to the downwardly sloped surface 94 which is in turn welded to the braces 88. There is no fixed connection between the cradle assemblies 70 and 72 and the I-beam. The cradle assemblies are supported on the I-beams by the leg portions 90 of the braces 88 resting on top of the flange 82 and the horizontally extending surface 96 resting on the upper surface 80 of the I-beam.

A locking wedge 100 is used for securing the cradle assembly to the I-beam by pulling against the downwardly extending flange 98 carried on the bracket.

The locking wedge 100 forms part of the bracing 78 that is carried between the I-beams 14 and 18.

Figure 6:
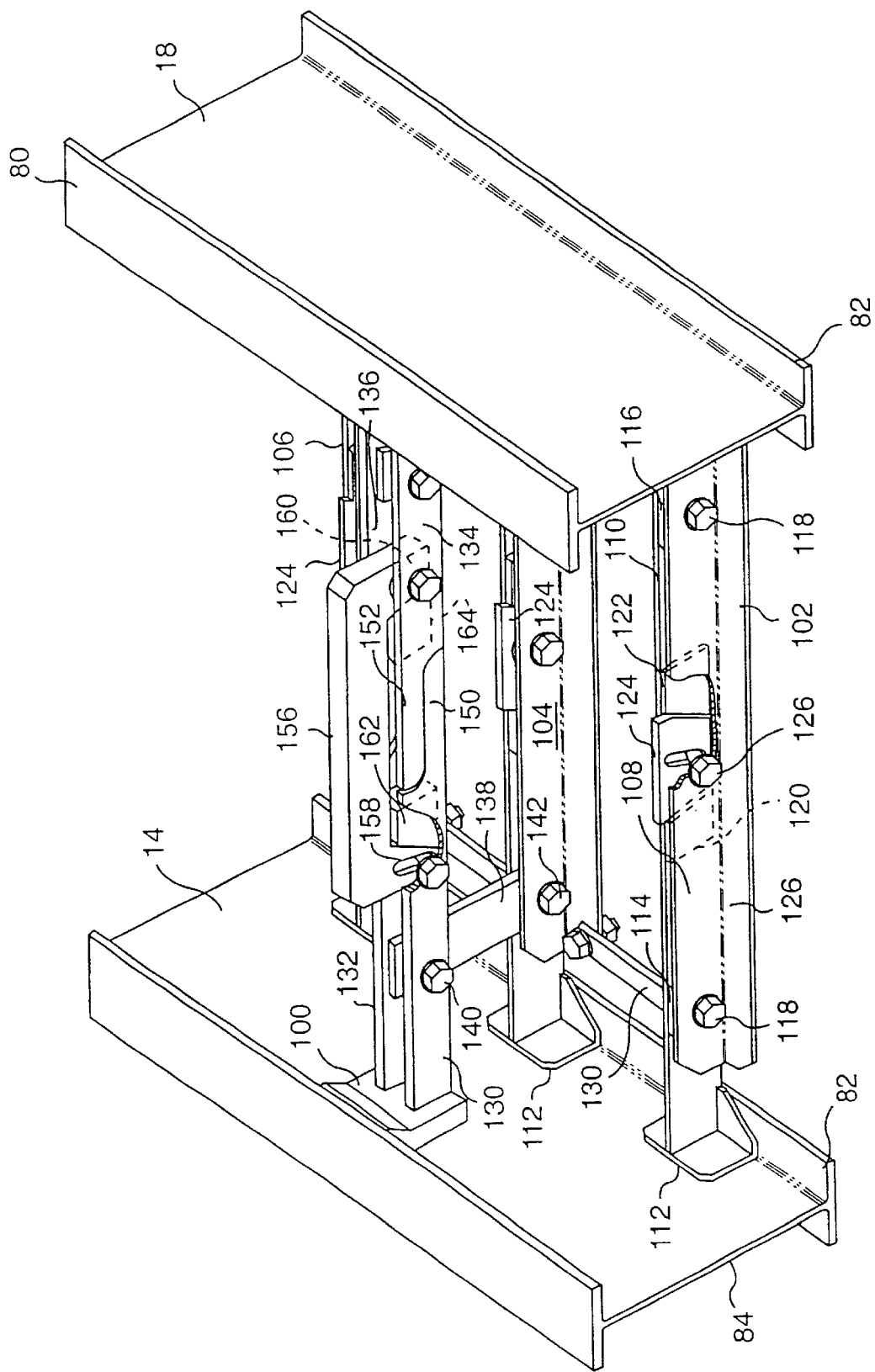
FIG. 6 is a perspective view illustrating the manner in which the bracing is attached between the I-beams of a trailer.

The bracing as shown in FIG. 6 includes three elongated adjustable bar members 102, 104 and 106 all of which are of the same construction. The adjustable bar member 102 includes a pair of spaced bars 108 and 110 that extend between the I-beams. Each of the space bars has an abutting plate 112 welded to the end thereof which, when in use, presses against the side surface of the vertically extending plate 84 of the I-beams. The two space bars 108 and 110 are permitted to move longitudinally relative to each other to produce a fixed connection between the I-beams.

Positioned between the bars 108 and 110 are spacer plates 114 and 116 that have elongated holes provided therein through which a bolt 118 extends. In the center portion of the space bars 108 and 110, there are two spacer plates 120 and 122. Spacer plate 120 is secured to the bar 108 while spacer plate 122 is secured to bar 110. The spacer plates 120 and 122 have inclined surfaces facing each other so as to define a substantially v-shaped slot. A wedge 124 is carried on a bolt 126 and has an elongated vertically extending slot 128 provided therein. The wedge 124 has inclined side edges that correspond to the v-shaped slot defined by the edges of the plates 120 and 122. As a result, when the wedge 124 is pushed downwardly the edges of the wedge 124 will press against the plates 120 and-122 and force the bars 108 and 110 outwardly to cause a pressure connection between the butt plates 112 and the vertically extending plate 84 of the I-beams. Once the wedge is driven down to secure the bars 108 and 110 flush against the I-beams, the bolts are tightened.

Each of the bars 102, 104 and 106 have horizontally extending flanges 126 and 128 provided thereon. The flange member 126 is connected to the slide plate 108. Slide plates 110 have similar flange plates extending in the opposite direction. Tie bars 130 are connected between adjacent flanges 126 and 128 to stabilize the bracing.

The locking wedges 100 are carried on the ends of elongated bars 130 and 132 and 134 and 136. The bars 130 and 132 are supported on a vertically extending plate 138. The plate 138 extends between the adjustable bar assembly 104 and the bars 130 and 132 and is connected thereto by means of bolts 140 and 142. The elongated bars 130 and 134 have a removed section 144 adjacent their inner ends. The section 144 that is removed adjacent the upper surface of bar 130 wherein the section that is removed from bar 134 is adjacent the lower section so that when the bars 130 and 134 are nested such as shown in FIG. 6, the finger portion 150 and 152 remaining on the end of the bars overlap. It is also noted as shown in FIGS. 5 and 6 that there is a slight gap provided between the end of finger 152 and the mating surface provided on the bar 134.

The purpose of permitting these gaps adjacent the end of the fingers 150 and 152 is to allow the two bars 130 and 132 which support locking wedge 100 to be moved relevant to the bars 134 and 136 which support the wedge provided on the other side. In order to lock the cradle assembly onto the I-beams 14 and 18, it is necessary to draw the bars 130 and 132 inwardly. This is accomplished by means of a wedging bar 156. The wedging bar has a pair of downwardly extending flanges 158 and 160 provided thereon. Elongated vertically extending slots are provided in the flanges 158 and 160. The inner edges of the flanges 158 and 160 taper outwardly and mesh with the inner edges carried on blocks 162 and 164 which slope in the same direction as the inner edge of flanges 158 and 160. As a result, as the wedging bar 156 is pushed downward on the bolts 165 and 167 the wedging surfaces draw the wedges 100 and 100 together to lock the cradles on the I-beam. The wedging block 162 is connected between the plates 130 and 132 whereas the wedging block 164 is connected between the plates 134 and 136. Once the wedging member 156 is pushed down to draw the wedges 100 inwardly tightly against the flanges 98 carried on the cradle assembly, they are locked in place by tightening the bolts 164 and 166.

Figure 7:
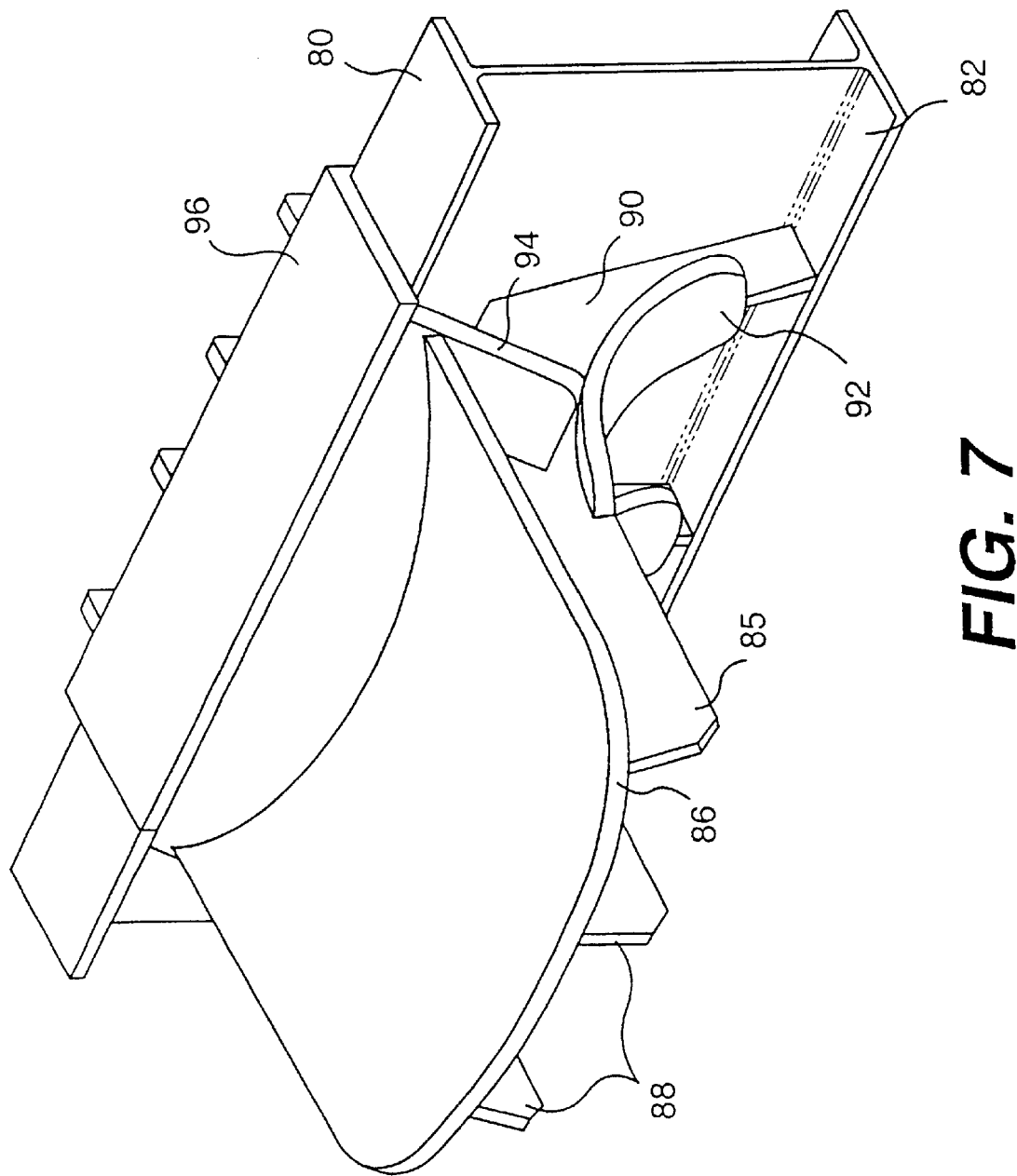
FIG. 7 is a perspective view of a wheel-supporting cradle attached to an I-beam of the trailer.

In order to install the support for stacking trailers such as shown and described in connection with FIGS. 4–7, the bracing generally designated by the reference character 78 which carries the locking wedges 100 is slid between the two I-beams 14 and 18 to a position directly over the rear wheels of the trailer. The wedges 124 are forced downwardly on the bolt 126 and press against the edges of the plates 120 and 122 to cause the bars 108 and 110 to move outwardly to force the abutting plates 112 flush against the vertical flange 84 of the I-beams. The bolts 118 and 126 are tightened to lock the bracing 78 in place. Once the bracing is locked in place, then the cradle assembly such as shown in FIG. 7 is placed on top of the I-beam so that the flanges 98 extend over the locking wedges 100. When the cradle assemblies 70 and 72 are in position, the wedging bar 156 is pushed downwardly. As the wedging bar 156 is pushed downwardly, it draws the arms 130 and 132 as well as the arms 134 and 136 inward. This causes the wedges 100 to lock against the downwardly turned flanges 98. The bolts 140, 165 and 167 are then tightened to lock the bars 130, 132 and 134, 136 in position. Once all of the bolts in the bracing and the locking mechanism are tightened, the cradle assembly is rigidly connected to the I-beams 14 and 18 so that the trailers can be stacked one upon another.

The cradle assembly shown in FIGS. 4–7 can be selectively placed on trailers or removed from the trailers depending on whether stacking is desired.

Having thus described the invention in terms of a preferred embodiment, it will be readily apparent to those skilled in the art that many modifications and variations may be introduced without departing from the invention scope of the present invention.

What is claimed:

1. A support for a trailer for permitting stacking of similar trailers upon each other, said trailers including a pair of elongated spaced I-beams forming the body of said trailer, and a set of spaced wheels, said support comprising:

an arcuate cradle;
   a bracket for attaching said cradle to a respective I-beam; and
   a cradle assembly carried by each of said I-beams for receiving at least one wheel of said set of rear wheels of the trailer stacked thereon, said bracket including a supporting structure connected to said cradle on one side of said I-beam, a connecting support having one side connected to said supporting structure and another side connected to an intermediate member resting on a top surface of said I-beam, and a downwardly extending flange integral with said intermediate member for extending around and under said top surface of said I-beam.

2. The support as set forth in claim 1 further comprising:
   a locking member engaging said downwardly extending flange for securing said support to said I-beam.

3. A removable cradle assembly for attachment to a pair of spaced elongated I-beams forming part of an elongated trailer for permitting stacking of trailers on top of each other, a set of spaced rear wheels for supporting said trailers, said I-beams having upper and lower horizontal surfaces that are joined by a vertically extending plate, said removable cradle assembly comprising:

bracing carried between said I-beams;
   a pair of locking wedges carried on opposite ends of said bracing with a respective locking wedge being positioned under a respective upper surface of a respective I-beam;
   a pair of arcuate cradles carried by said I-beams on opposite sides of said vertically extending plates of said I-beams from said locking wedges;
   flanges carried by said arcuate cradles extending over said upper horizontal surfaces of said I-beams and terminating in a downwardly extending lip that engages said locking wedges for securing said cradles to the I-beams so that when a trailer is stacked upon a lower trailer, the wheels of the upper trailer are supported in said arcuate cradles.

4. The removable cradle assembly as set forth in claim 3 wherein said bracing includes:
   a plurality of laterally extending elongated bar assemblies;
   butt plates carried on opposite ends of said bar assemblies for pressing against said vertically extending plates of said I-beams to secure said bracing between said I-beams.

5. The removable cradle assembly as set forth in claim 3 wherein said bracing includes:
   an elongated adjustable bar member supporting said locking wedges on opposite ends thereof,
   a length adjustable device carried by said elongated bar member for varying the overall length of said elongated adjustable bar to draw said locking wedges toward each other tightly against said flanges for securing said arcuate cradles to said I-beams.

6. A support for a trailer for permitting stacking of similar trailers upon each other, said trailers including a pair of elongated spaced I-beams forming the body of said trailer, and a set of spaced rear wheels carried by said I-beams, said support comprising:

a cradle assembly carried by each of said I-beams for receiving at least one wheel of a respective set of said rear wheels of the trailers stacked thereon;
   a bracket supported on a respective I-beam connected to said cradle assembly supporting said cradle assembly on a respective I-beam;
   a said bracket including a downwardly extending flanges that extends down along one side of said I-beam; and
   a locking member engaging said downwardly extending flange securing said brackets to said I-beams.

* * * * *